United States Patent
Gizzi Giaimo

(10) Patent No.: US 11,010,438 B2
(45) Date of Patent: May 18, 2021

(54) SYSTEMS AND METHODS TO PROVIDE SOCIAL SERVICES

(71) Applicant: SOS Matters, LLC, Rumson, NJ (US)

(72) Inventor: Christine Marie Gizzi Giaimo, Locust, NJ (US)

(73) Assignee: SOS Matters, LLC, Rumson, NJ (US)

( * ) Notice: Subject to any disclaimer, the term of this patent is extended or adjusted under 35 U.S.C. 154(b) by 230 days.

(21) Appl. No.: 16/215,209

(22) Filed: Dec. 10, 2018

(65) Prior Publication Data

US 2019/0179860 A1   Jun. 13, 2019

Related U.S. Application Data

(60) Provisional application No. 62/597,373, filed on Dec. 11, 2017.

(51) Int. Cl.

| | |
|---|---|
| *G06F 16/9535* | (2019.01) |
| *G06F 16/9538* | (2019.01) |
| *G06F 21/62* | (2013.01) |
| *G06F 16/9536* | (2019.01) |
| *G06F 16/28* | (2019.01) |
| *G06Q 50/00* | (2012.01) |
| *G06F 16/9537* | (2019.01) |

(52) U.S. Cl.
CPC ........ *G06F 16/9535* (2019.01); *G06F 16/285* (2019.01); *G06F 16/9536* (2019.01); *G06F 16/9537* (2019.01); *G06F 16/9538* (2019.01); *G06F 21/6245* (2013.01); *G06Q 50/01* (2013.01)

(58) Field of Classification Search
CPC ........... H04L 51/32; H04L 63/10; G09B 7/02; G06F 16/2474; G06F 9/505; G06F 16/9535
See application file for complete search history.

(56) References Cited

U.S. PATENT DOCUMENTS

| | | | | |
|---|---|---|---|---|
| 2001/0034015 | A1* | 10/2001 | Raichur | G09B 7/02 434/322 |
| 2008/0313345 | A1* | 12/2008 | Bernardin | G06F 9/505 709/235 |
| 2011/0196923 | A1* | 8/2011 | Marcucci | H04L 51/32 709/204 |
| 2017/0186123 | A1* | 6/2017 | Shelton | H04L 63/10 |
| 2019/0108247 | A1* | 4/2019 | Kavanagh | G06F 16/2474 |

* cited by examiner

*Primary Examiner* — Etienne P Leroux
(74) *Attorney, Agent, or Firm* — John Maldjian; Maldjian Law Group LLC

(57) ABSTRACT

Embodiments of the present invention are directed to a method including receiving, at a user terminal, one or more search queries from a user. The method also includes determining location parameters associated with the user terminal and the one or more search queries. The method further includes transmitting, by the user terminal, the one or more search queries and the location parameters to a server. The method also includes retrieving, by the server, one or more search results from one or more resource directories in accordance with the one or more search queries and the location parameters. The method further includes displaying, by the server, the one or more search results at the user terminal.

16 Claims, 7 Drawing Sheets

SYSTEMS AND METHODS TO PROVIDE SOCIAL SERVICES

CROSS-REFERENCE TO RELATED APPLICATIONS

This application claims the benefits of U.S. Provisional Application Ser. No. 62/597,373, filed Dec. 11, 2017, entitled "SYSTEM AND METHOD TO PROVIDE SOCIAL SERVICES" which is incorporated herein in its entirety.

FIELD OF INVENTION

Embodiments of the present invention relate to systems and methods for providing public information and social services within a geographic region. Specifically, embodiments are directed to providing public information and social services to users during crisis within a geographic region.

BACKGROUND

The advent of global communication networks has aided in the growth of social interaction. Cellular and internet protocol networks are a central means for interacting or communicating. While network users have mechanisms for searching and communicating (or socializing) on a variety of topics of interest, this vast resource of information available presents a formidable challenge in the process of finding the desired search results and/or other people with similar points of interest.

Electronic modes of communication have also reduced the usage of traditional yellow pages or telephone directories. Search engines have replaced the traditional telephone directory, which, in many instances, have been digitized and shared across the internet. In addition online business directories known as internet yellow pages are also available. However, to ascertain the desired information, a manual search is required.

Various search engines are available which can provide information in response to one or multiple queries. The search engines run algorithms catered to searching for information across the internet and provide links to information that closely match the received queries. However, existing search engines provide generalized information and are not catered to facilitating access to specific information pertaining social services within a geographic region for individuals involved in a crisis situation. In a crisis situation, the time required to conduct a search for relevant information remains critical. Further, upon obtaining a set of results through the search engine, a user must decide upon a relevant service in a crisis without adequate judgment or time to make such a decision. In addition, information searched in response to the query may be outdated and/or localized results may also not be available. Further, search results may not provide resources that are directed to vetted professionals. For example, a query on a health-related issue may result in sets of information that are outdated or may be directed to related services that are not locally available, fraudulent links and sets of information provided by non-professionals which may mislead the inquirer.

Therefore, it is desirable to provide a system that brings forth localized and relevant information in response to a query. The system guides and directs an individual or a group to vital resources for personal growth or crisis recovery utilizing skilled resource professionals.

SUMMARY

Embodiments in accordance with the present invention provide a method comprising receiving, at a user terminal, one or more search queries from a user; determining location parameters associated with the user terminal and the one or more search queries; transmitting, by the user terminal, the one or more search queries and the location parameters to a server; retrieving, by the server, one or more search results from one or more resource directories in accordance with the one or more search queries and the location parameters; and displaying, by the server, the one or more search results at the user terminal.

Embodiments in accordance with the present invention provide a method comprising receiving, at a user terminal, one or more search queries from a user, wherein the one or more search queries comprise at least one of data retrieval filters, display options, a level of urgency and a level of privacy; determining location parameters associated with the user terminal and the one or more search queries; transmitting, by the user terminal, the one or more search queries and the location parameters to a server; retrieving, by the server, one or more search results from one or more resource directories in accordance with the at least one of the data retrieval filters and the level of urgency associated with the one or more search queries and the location parameters; and displaying, by the server, the one or more search results at the user terminal in accordance with at least one of the display options and the level of privacy associated with the one or more search queries.

Embodiments in accordance with the present invention provide a system comprising at least one user terminal configured to receive one or more search queries from a user; wherein the one or more search queries comprise at least one of data retrieval filters, display options, a level of urgency and a level of privacy. The system further comprises a server, communicably coupled to the user terminal, wherein the server is configured to receive the one or more search queries and location parameters associated with the at least one user terminal; retrieve one or more search results from one or more resource directories in accordance with the at least one of the data retrieval filters and the level of urgency associated with the one or more search queries and the location parameters; and display the one or more search results at the user terminal in accordance with at least one of the display options and the level of privacy associated with the one or more search queries.

Embodiments of the present invention are directed to systems and methods to facilitate access to public information and social services by a geographical region. Individuals or groups are guided to vital resources for personal growth or crisis recovery utilizing skilled resource professionals with the intent to educate, empower and support.

Some embodiments of the present invention are directed to systems and methods directed to enable supportive social services at a localized level. Specifically, embodiments are directed to the systems and the methods which retrieve results that are related to public information and social services of a geographical region from resource directories, in response to a query from a user. The resource directories may include crisis resources such as a resource directory having the names of vetted professionals, certified professionals or non-profit organizations having a particular area of expertise in a particular state, county, city, town, etc. The resource directories are updated periodically and/or aperiodically.

Some embodiments of present invention are related to a system which provides an assistance platform that acts as a personal assistant to a user to aid in crisis recovery and support services.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
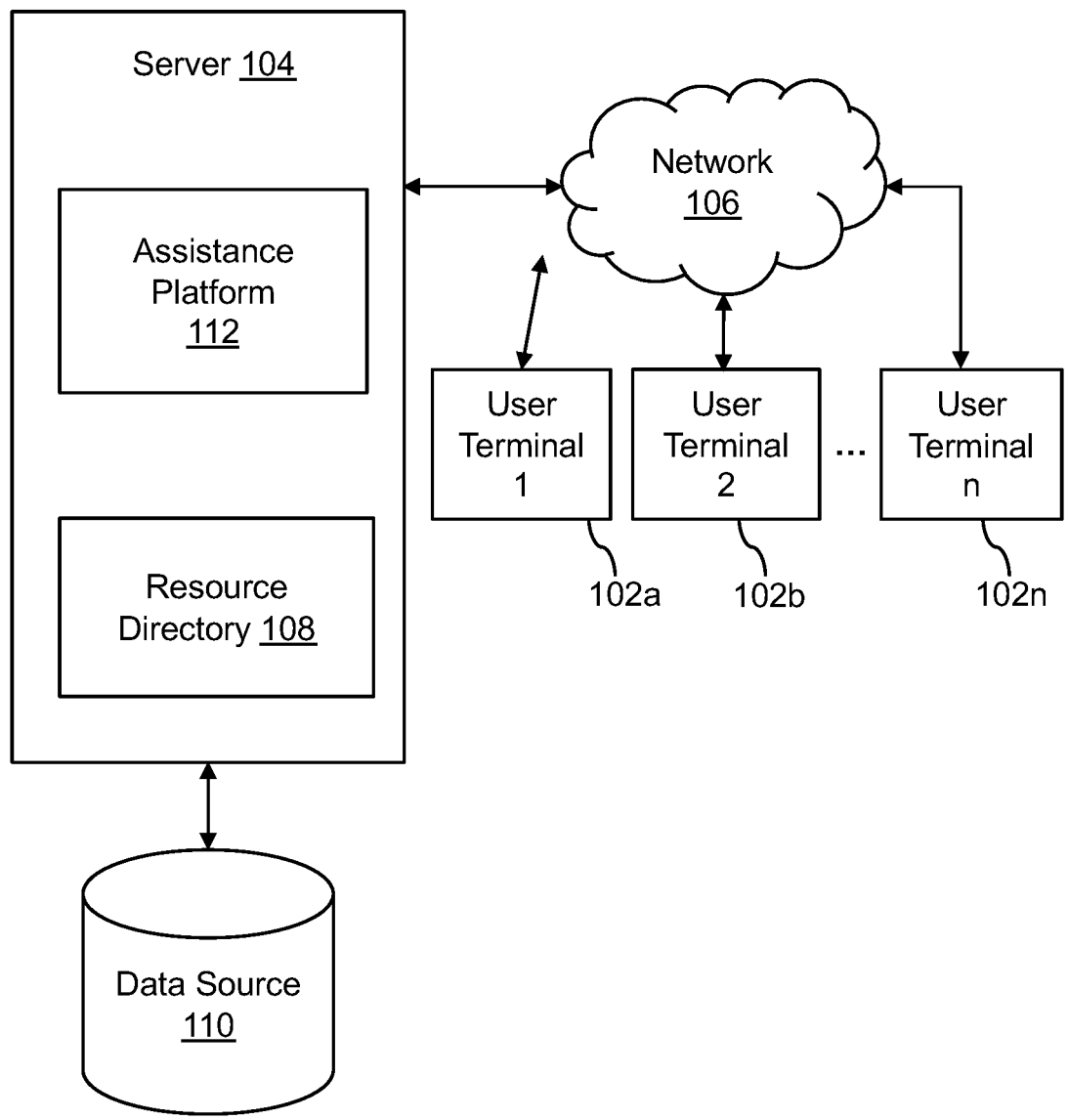
FIG. 1 illustrates a system for providing information to a user during a crisis, in accordance with an embodiment of present invention.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modifications, equivalents and alternatives falling within the spirit and scope of embodiments of the present invention as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

It will be noted that throughout the appended drawings, like features are identified by like reference numerals.

DETAILED DESCRIPTION

Embodiments of the present invention will be described below in conjunction with exemplary embodiments of the system and method to provide public information and social services within a geographic region.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

FIG. 1 illustrates a system 100 for providing assistance to a user during a crisis, in accordance with an embodiment of present invention, wherein the system 100 is configured to provide a platform facilitating access to public information and social services based on a geographic region. In some embodiments of the present invention, the system 100 may act as a social service conduit, an information center, or a search engine to facilitate access to public information and social services based on a geographical region during a crisis such as, but not limited to, mental health, addiction, bullying, immigration, etc.

The system 100 includes one or more user terminals 102a-n (hereinafter collectively referred to as "the user terminal 102") and a server 104. In some embodiments of the present invention, the system 100 guides and directs users through the user terminal 102 to vital resources for personal growth or crisis recovery. In some embodiments of the present invention, the user terminal 102 receives a query from a user and transmits the query to the server 104. In other embodiments of the present invention, the server 104 may include an assistance platform 112 for providing assistance to users during such as, but not limited to, a crisis situation. The assistance platform 112 may retrieve one or more search results from a resource directory 108 based on the query received from the user. In an illustrated embodiment of the present invention, the server 104 includes a single resource directory 108, however the server 104 may include any number of resource directories 108 within the scope of present invention. The assistance platform 112 may also provide the one or more search results to the user on a display of the user terminal 102. The functioning of the assistance platform 112 may be explained in detail in conjunction with FIG. 2.

Further, the resource directory 108 is communicably coupled to a data source 110 to retrieve information. In an exemplary embodiment of the present invention, the user terminal 102, the server 104, and the data source 110 are connected through a network 106.

In some embodiments of the present invention, the user terminal 102 may be any electronic device, such as desktop computers, portable computers, smartphones, tablet computers, wearable devices, and the like. In other embodiments of the present invention, the user terminal 102 may also include a display unit (not shown) for displaying any data. The display unit can include, but not limited to, a Cathode Ray Tube (CRT) display, a Liquid Crystal Display (LCD), a Light Emitting Diode (LED) display, and the like. Embodiments of the present invention are intended to include or otherwise cover any type of display, including known, related art, and/or later developed technologies. In some embodiments of the present invention, the user terminal 102 may include one or more location sensors (not shown) to determine location parameters associated with the user terminal 102. In other embodiments of the present invention, the location parameters are the longitude and latitude coordinates of the user terminal 102. The location parameters may define a real-time geographical location of the user terminal 102. In other embodiments of the present invention, the user terminal 102 may transmit the received query and the location parameters to the server 104 through the network 106.

The network 106 may include a data network such as, but not restricted to, the Internet, local area network (LAN), wide area network (WAN), metropolitan area network (MAN), etc. In certain embodiments of the present invention, the network 106 can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc. In some embodiments of the present invention, the network 106 may include or otherwise cover networks or sub-networks, each of which may include, for example, a wired or wireless data pathway. The network 106 may include a circuit-switched voice network, a packet-switched data network, or any other network capable for carrying electronic communications. For example, the network 106 may include networks based on the Internet protocol (IP) or asynchronous transfer mode (ATM), and may support voice usage, for example, VoIP, Voice-over-ATM, or other comparable protocols used for voice data communications. In one implementation, the network 106 includes a cellular telephone network configured to enable exchange of text or SMS messages.

Examples of the network 106 may further include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth. Embodiments of the present invention are intended to include or otherwise cover any type of network, including known, related art, and/or later developed technologies to connect the server 104 and the user terminal 102 with each other.

In an embodiment of the present invention, the user terminal 102 provides a graphical user interface to receive one or more search queries from a user. The user terminal 102 may receive the one or more search queries from through various input methods. The input methods are directed to, but not limited to, a speech or an audio input, a video input, a touch input, and an input through typing the query on a keyboard, and so forth. In other embodiments of the present invention, the query may be provided in a natural language. In yet other embodiments of the present invention, the one or more search queries includes various query parameters such as, but not limited to, data retrieval filters, display options, a level of urgency required in providing resources and/or a level of privacy in relation to the search query. In other embodiments of the present invention, the one or more search queries may include information or data directed to a location of the user, parameters directed to the type of resource needed and/or description of a crisis, and so forth.

In an exemplary embodiment of the present invention, the graphical user interface may include various fields corresponding to different query parameters. In other embodiments of the present invention, the graphical user interface may include a single query field to receive a query. In other embodiments of the present invention, the graphical user interface may include a search button to submit the one or more search queries. The search button may be clicked by the user to initiate the search. In some embodiments of the present invention, the user terminal 102 may transmit the one or more search queries, received through the graphical user interface, to the server 104. In other embodiments of the present invention, the user terminal 102 may also transmit location parameters, associated with the user terminal 102 to the server 104 upon activation of the search button.

In one embodiment of the present invention, the server 104 is communicably coupled to the resource directory 108. The resource directory 108 may include details of vetted professionals or certified professionals or non-profit organizations that are registered with the system 100, through the server 104. In another embodiment of the present invention, the resource directory 108 is a live directory of information, stored on the server 104. In yet other embodiments of the present invention, the resource directory 108 is updated at predefined intervals. In an embodiment of the present invention, the server 104 may determine the predefined intervals to update the resource directory 108. 108. The resource directory 108 provides a forum for reference, advocacy and project creation, in some embodiments. The resource directory 108 may use a family of standard web feed formats to publish frequently updated information relating to resources pertaining to any requests from the user terminal 102.

In an embodiment of the present invention, the server 104 includes the assistance platform 112. The assistance platform 112 may be software application which is installed within a memory (not shown) associated with the server 104. In other embodiments of the present invention, the assistance platform 112 may be implemented as a hardware, a firmware, a software, or a combination thereof. The assistance platform 112 performs various operation of the server 104 in conjunction with an application of the system 100. The server 104 may include a processing component (not shown) which may execute instructions received from the assistance platform 112 to perform the various operations of the server 104.

In an embodiment of the present invention, the assistance platform 112 may receive the one or more search queries from the user terminal 102. In another embodiment of the present invention, the assistance platform 112 may receive the one or more search queries form the user through various input devices such as, but not limited to, a mouse, a keyboard, a microphone, a touch panel, and so forth. The assistance platform 112 may also receive the location parameters associated with the user terminal 102 and/or the one or more search queries. In some other embodiments of the present invention, the assistance platform 112 may determine the location parameters associated with the user terminal 102.

Further, the assistance platform 112 may parse the one or more search queries to determine the one or more query parameters associated with the one or more search queries. For example, the one or more search queries may be parsed to determine at least one of query parameters such as, the data retrieval filters, the display options, the level of urgency and the level of privacy associated with the one or more search queries.

Next, the assistance platform 112 may retrieve one or more search results from the one or more resource directories 108 in accordance with the one or more search queries and the location parameters. In an embodiment of the present invention, the assistance platform 112 may transform the one or more search results in a predefined format. In other embodiments of the present invention, the assistance platform 112 may implement various algorithms including, but not limited to, statistical methods, probabilistic methods, and so forth to convert or transform the one or more search results in a predefined format.

In some embodiments of the present invention, the assistance platform 112 may arrange the one or more search results in an order. The assistance platform 112 may arrange the one or more search results based on the various parameters such as relevancy of the search result with respect to the query, the level of urgency of the search results and the level of privacy of the search results, etc. For example, if a user searches for a medical help in an emergency, the search results relating to nearby medical practitioner who provides home consultation will be given a high relevancy as compared to a medical practitioner sitting in a hospital.

Further, the assistance platform 112 may notify the user about the execution of the one or more search queries. In some embodiment, the assistance platform 112 may notify the user with contact details of medical practitioners in case of a health issue. The assistance platform 112 may send a notification to the user when the search results based on the one or more search queries and the location parameters are retrieved. Further, the assistance platform 112 may transmit the search results to the user terminal 102. In an embodiment of the present invention t, the assistance platform 112 may be configured to generate a graphical user interface to display the one or more search results at the user terminal 102. In another embodiment of the present invention, the assistance platform 112 may be configured to generate a graphical user interface to receive the one or more queries from the user.

In some embodiments of the present invention, the assistance platform 112 may store the one or more search results in a database (not shown). The database may be communicably coupled to the server 104. In other embodiments of the present invention, the assistance platform 112 may categorize the one or more search results. The assistance platform 112 may categorize and/or store the one or more search results on the resource directory 108 based on parameters such as a location, requirement, relevancy, ratings and the like.

In some embodiments of the present invention, the resource directory 108, through the server 104, may communicatively coupled to a data source 110. The data source 110 may be intended to be any type of data source including social media networks, search engines, portals, remote servers, network storage units, etc. Embodiments of the present invention are also intended to include or otherwise cover any other type of data source that may be beneficial to provide data related to the query received from the user. The data source 110 is merely provided for exemplary purposes, and the various inventive aspects are intended to be applied to any type of data source on the network 106 connected to the server 104 and the user terminal 102.

In some embodiments of the present invention, the assistance platform 112 may generate the resource directory 108 from resources obtained from the data source 110. In other embodiments of the present invention, the user interface module may display the resource directory 108 on the user terminal 102 and update the resource directory 108 periodically and/or aperiodically. The user interface module may provide resource information through the resource directory 108 based on the one or more search queries. The resource information may include supportive services and information relating to, for example, mental health professionals in a geographic region may be provided in response to a query that is directed to mental health or a crisis concerning mental health.

In some embodiments of the present invention, various services may be registered with the system 100 so that information pertaining to those services may be deemed more relevant. For example, supportive services at a hyper local level, pertaining to, but not limited to, mental health, domestic violence, libraries and other social services, may be registered with the system 100. Consequently, those services that are registered may categorized as a top resource in response to a query. Registration may be aided by various initiatives such as, but not limited to, crowd funding and professional membership. Through crowd funding, highly rated professionals may be compensated to provide services to the users in need during a crisis. Professional membership may be directed to methods to compensate professionals providing services through advertising schemes, in some embodiments. Outreach programs, non-governmental organizations and university social work programs may also be registered to provide resources through the system 100.

Crowd funding may be used in registering resources including individuals trained in areas such as, but not limited to, mental health, rehabilitation, counselling on addiction, domestic violence prevention, prevention of bullying, stress-related issues and the like. Resources are registered on the system 100 and information of these resources are provided to the user terminal 102 in response to a corresponding query. The registered resources may interact with the user terminal 102 on a social platform or a social forum hosted on the server 104. These interactions may have varying levels of privacy based on the query received.

Figure 2:
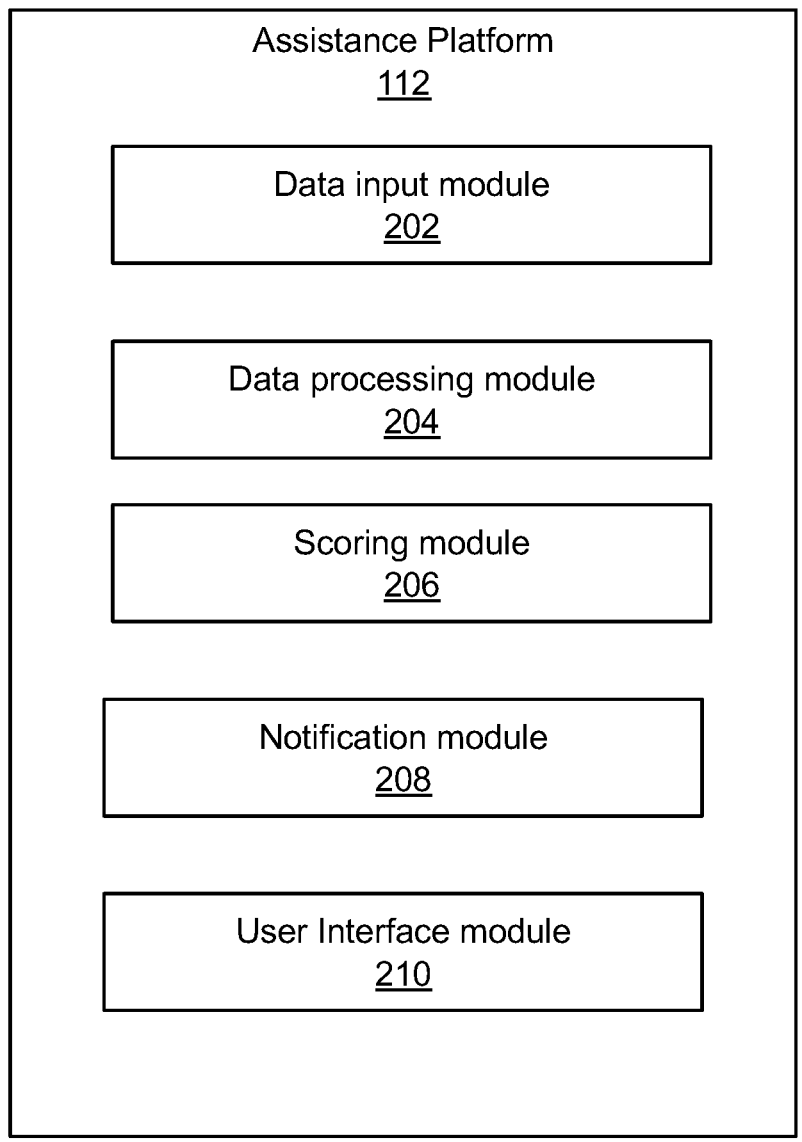
FIG. 2 illustrates components of an assistance platform, in accordance with an embodiment of present invention.

FIG. 2 illustrates various components of the assistance platform 112, in accordance with an embodiment of present invention. The assistance platform 112 may include various executable modules for performing one or more computing, data processing, or network-based instructions of the server 104 to provide public information and social services to a user. Such modules may be implemented in hardware, firmware, software, or a combination thereof. The components of the assistance platform 112 may include, but are not restricted to, a data input module 202, a data processing module 204, a scoring module 206, a notification module 208, and a user interface module 210, according to an embodiment of the present invention.

The data input module 202 may be configured to receive one or more search queries from the user terminal 102. In some embodiments of the present invention, the data input module 202 may store the received query in a database (not shown) associated with the server 104. The data input module 202 may receive the one or more search queries from a user through various input devices such as, but not limited to, a mouse, a keyboard, a microphone, a touch panel, and so forth. In an exemplary embodiment of the present invention, the data input module 202 may receive the one or more search queries in natural language. Further, the data input module 202 may be configured to receive the location parameters associated with the user terminal 102 and/or the one or more search queries.

The data processing module 204 may be configured to perform the various processing operations of the assistance platform 112. The data processing module 204 may be communicably coupled to the data input module 202, the scoring module 206, the notification module 208 and the user interface module 210. The data processing module 204 may also be configured to determine the location parameters associated with the user terminal 102 and the one or more search queries.

Further, the data processing module 204 may be configured to parse the one or more search queries to determine one or more query parameters associated with the one or more search queries. For example, the data processing module 204 may parse the one or more search queries to determine query parameters such as, data retrieval filters, display options, a level of urgency and a level of privacy associated with the one or more search queries.

Further, the data processing module 204 may be configured to retrieve one or more search results from the one or more resource directories 108 in accordance with the one or more search queries and the location parameters. The data processing module 204 may be configured to transform the one or more search results in a predefined format. In some embodiments of the present invention, the data processing module 204 may categorize the one or more search results.

The data processing module 204 may also update the one or more resource directories 108 at predefined intervals, in one embodiment of the present invention. The predefined interval may be, but not limited to, daily, bi-weekly, weekly, and so forth.

The scoring module 206 may be configured to arrange the one or more search results in an order. In an embodiment of the present invention, the scoring module 206 may be configured to provide a score to each of the search results based on the relevancy to a search query. The scoring module 206 may arrange the one or more search results based on the various parameters such as relevancy of the search result with respect to the query, the level of urgency of the search results and the level of privacy of the search results. The scoring module 206 may then arrange the search results in either ascending or descending order. For example, the scoring module 206 provide a score '9' to a medical practitioner who provide home consultancy as compared a medical practitioner sitting at a hospital is provided with a score '4' for a query of a user relating to medical help at home.

In some embodiments of the present invention, the scoring module 206 may determine the level of privacy in relation with a threshold. For example, the levels of privacy may be designated as low, medium and high. The medium level may be tagged as the threshold. The scoring module 206 may also tag the search results based on their level of privacy. For example, the scoring module 206 may provide a high privacy to the search results for a query relating to help in domestic violence.

In other embodiments of the present invention, the scoring module 206 may determine the level of urgency in relation with a threshold. For example, levels of urgency may be designated as low, medium and high. In one embodiment of the present invention, the medium level may be tagged as the threshold. In other embodiments of the present invention, the scoring module 206 may tag the search results based on their level of urgency. For example, the scoring module 206 may provide a high level of urgency to search results for medical help and a low level of urgency to search results for reservation for dinner at a restaurant.

The notification module 208 may be configured to notify the user upon successful execution of the one or more search queries. The notification module 208 may send a notification to the user when the data processing module 204 successfully retrieve the one or more search results based on the one or more search queries and the location parameters. In some embodiments of the present invention, the notification module 208 may send a notification at the user terminal 102 with information of the resource(s) required by the user during the crisis. For example, in case of a medical issue, the notification module 208 may send a notification to the user terminal 102 including the contact details of a medical practitioner. Further, the notification module 208 may be configured to contact a resource when the user activates an emergency button. For example, the notification module 208 may be configured to initiate an automatic call to local emergency services upon activation of an emergency button by the user through the user interface.

The user interface module 210 may be configured to generate a graphical user interface at the user terminal 102 to receive the one or more search queries and display the one or more search results. In an exemplary embodiment of the present invention, the user interface module 210 generates a user interface to receive a natural language query at the user terminal 102. Further, the user interface module 210 may be configured to generate a user interface at the user terminal 102 to display the one or more search results.

Figure 3A:
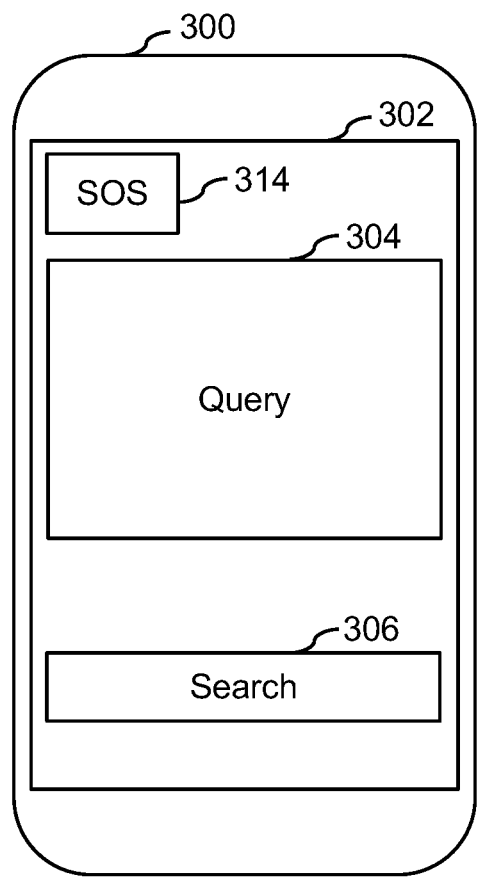
FIG. 3A illustrates a graphical user interface on a user terminal for receiving a query, in accordance with an embodiment of present invention.

FIG. 3A illustrates a graphical user interface 302 (interchangeably referred to as "the user interface 302") on a display screen of a user terminal 300 for receiving a query, in accordance with an embodiment of present invention. The user terminal 300 is similar to the user terminal 102, as shown in FIG. 1. In an exemplary embodiment of the present invention, the user terminal 300 is a smartphone. In other embodiments of the present invention, the user terminal 300 may include an application installed in a memory (not shown) of the user terminal 300 to access public information. In alternative embodiments of the present invention, the system 100 (shown in FIG. 1) may provide a web address to the user to access public information on the user terminal 300. The user terminal 300 may receive one or more search queries from a user through the user interface 302. In an embodiment of the present invention, the user interface 302 includes a query field 304 to receive the one or more search queries from the user. The one or more search queries may be in natural language. In some embodiments of the present invention, the user terminal 300 may identify the one or more search queries received through the query field 304 and transmit the one or more search queries to the server 104. The user terminal 300 may transmit the one or more search queries to the assistance platform 112. In other embodiments of the present invention, the server 104 may identify the one or more search queries and compare the queries received through the query field 304. The one or more search queries may include at least one of query parameters such as, but not limited to, data retrieval filters, display options, a level of urgency of the required resource and/or information and a level of privacy to be attributed to search results. The one or more query fields 304 may include, but not limited to, a drop-down list, a radio button list, a checklist and so forth. In some embodiments of the present invention, the at least one of query parameters may be defined by the user in the query field 304. In other embodiments of the present invention, the user interface 302 may include a plurality of query fields 304 relating to respective query parameters. For example, the user interface 302 may include a data retrieval query field to receive the data retrieval filters. Similarly, the user interface 302 may include various other query field to receive different query parameters associated with one or more query. In some embodiments of the present invention, the user terminal 300 may transmit different query parameters with a respective query field name. In other embodiments of the present invention, the user terminal 300 may aggregate the various query parameters received through one or more query fields 304 to form a query. The user terminal 300 then transmit the query to the server 104.

In an exemplary embodiment of the present invention, the user interface 302 may include a search button 306. The search button 306 may be clicked by the user to initiate the search. The user terminal 300 may transmit the one or more search queries, received through the user interface 302, to the server 104 upon activation of the search button 306. The user terminal 300 may also determine the location parameters using various location sensors. In other embodiments of the present invention, the location parameters associated with the user terminal 300 may be provided by the user in the one or more search queries. In alternative embodiments of the present invention, the location parameters are retrieved through a network provider of the user terminal 300. In some embodiments, the location parameters are the longitude and latitude coordinates of the user terminal 300. The user terminal 300 may be configured to transmit the one or more search queries and location parameters to the server 104 upon activation of the search button 306.

In an embodiment of the present invention, the graphical user interface 302 may include an emergency button 314 designated as "SOS" wherein the server 104 may initiate an automatic call to local emergency services upon activation of the emergency button 314. The server 104 may retrieve the local emergency services based on the location parameters associated with the user terminal 300. The server 104 may direct the corresponding emergency services or professionals to the determined location.

Figure 3B:
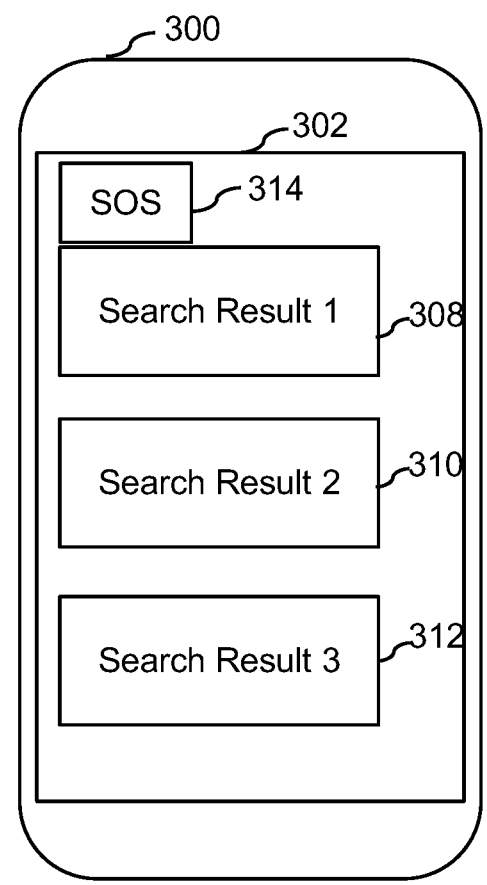
FIG. 3B illustrates a graphical user interface on the user terminal for displaying a set of search results, in accordance with an embodiment of present invention.

FIG. 3B illustrates the graphical user interface 302 on the display screen of the user terminal 300. The user interface 302 displays a set of search results 308, 310 and 312 on the user terminal 300. In some embodiments of the present invention, the server 104 may parse the one or more search queries to determine various query parameters such as the data retrieval filters, the display options, the level of urgency required in providing resources and the level of privacy to be attributed to the search results. The parsed query further includes information or data directed to the location of the user, parameters directed to the type of resource needed and/or description of a crisis. The server 104 may retrieve the set of search results 308, 310 and 312 from the resource directory 108 in accordance with at least one of the data retrieval filters and the level of urgency associated with the one or more search queries and location parameters of the user terminal 300. The server 104 may also display the set of search results 308, 310 and 312 at the user terminal 300 through the user interface 302. The search results 308, 310 and 312 may be, but not limited to, links directed to relevant web pages, contact information pertaining to relevant professionals or services, links to internet-enabled calls to relevant professionals or services and links to forums facilitated by the server 104. For example, in response to a query regarding sexual assaults, links directed to home web pages of county sexual assault advocates, contact information, and related forums may be provided on the graphical user interface 302. In some embodiments of the present invention, the search results 308, 310 and 312 are active data feeds from the resource directory 108, which are periodically and/or aperiodically updated. Further, the emergency button 314 is also provided with the search results 308, 310 and 312. In the illustrated embodiment of the present invention, the set of search results 308, 310 and 312 includes three search results, however, the set of search results may include any number of search results based on the one or more search queries and respective query parameters.

In other embodiments of the present invention, the server 104 may transform the search results 308, 310 and 312 in predefined formats. The server 104 may categorize the search results 308, 310, and 312 in accordance with relevance corresponding to the natural language query, ratings, need, and proximity to the location of user. The categorization of the search results 308, 310 and 312 is exemplary in nature, and various other categorization may be understood within the scope of the disclosure. The search results 308, 310 and 312 may be retrieved by the server 104 through tagging relevant streams of information available on, but not limited to, public domain web sites, official web sites of the state and/or country and official web pages of local authorities.

Figure 4:
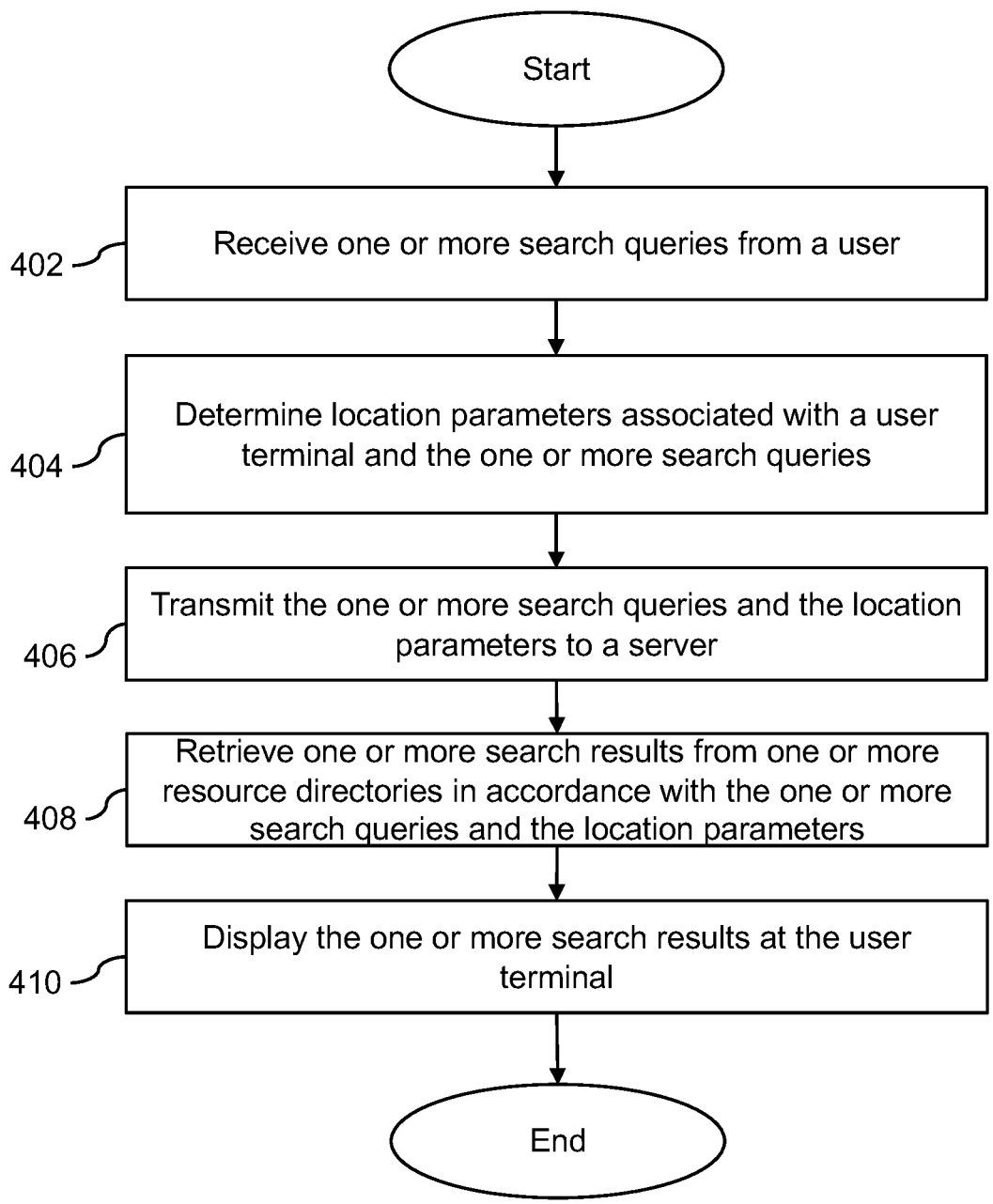
FIG. 4 is a flowchart of an exemplary method to provide assistance to a user during a crisis, in accordance with an embodiment of present invention.

FIG. 4 is a flowchart of an exemplary process 400 to display one or more results based on a query, in accordance with an embodiment of present invention. The process 400 provides one or more search results related to public information and social services of a geographical region.

At step 402, the user terminal 102 receives one or more search queries from a user during a crisis through the user interface 302 (shown in FIG. 3A). The one or more search queries includes at least one data retrieval filters, display options, a level of urgency and a level of privacy to retrieve and display one or more search results. In some embodiments of the present invention, the query may be received at the query field 304 of the user interface 302 in a natural language.

At step 404, the user terminal 102 determines location parameters associated with the user terminal 102 and the one or more received search queries. In some embodiments of the present invention, the user terminal 102 may determine the location parameters using one or more location sensors associated with the user terminal 102.

At step 406, the user terminal 102 transmits the one or more search queries and the location parameters to the server 104. In an exemplary embodiment of the present invention, the user terminal 102 is communicably coupled to the server 104 via the network 106.

At step 408, the server 104 retrieves one or more search results from one or more resource directories 108 in accordance with the one or more search queries and the location parameters of the user terminal 102. In some embodiments of the present invention, the server 104 may parse the one or more search queries to determine query parameters such as, data retrieval filters, the display options, the level of urgency and the level of privacy for retrieving the one or more search results. In an embodiment of the present invention, the location parameters of the user terminal 102 define a geographical region associated with the user terminal 102. In an exemplary embodiment of the present invention, the one or more search results are related to public information and social services of the geographical region defined by the location parameters of the user terminal 102. In other embodiments of the present invention, the server 104 may transform the one or more search results in a predefined format and may define or modify the predefined format. The predefined format may be defined or modified based on user's preferences. In other embodiments of the present invention, server 104 may implement various algorithms to convert or transform the one or more search results including, but not limited to, statistical methods, probabilistic methods, and so forth.

At step 410, the server 104 may display the one or more search results at the user terminal 102 through the user interface 302 (shown in FIG. 3B). Referring to FIG. 3B, the server 104 retrieves and displays a set of search results 308, 310 and 312 at the user terminal 300 through the user interface 302. The server 104 retrieves the set of search results 308, 310 and 312 based on the one or more search queries received at the query field 304 of the user interface 302. In some embodiments of the present invention, the server 104 may store the one or more search results in a database in a preset format that corresponds to data being organized in multiple tables with a key identifying a row and/or column in each table in the data. The keys provide logical connections between the rows and columns of one table and the rows and columns of another table. In other embodiments, the rows and columns in the multiple tables may be coupled data feeds from the data source 110 that are updated periodically and/or aperiodically. Consequently, the resource directory 108 provides resources with the latest information at any given point of time.

Figure 5:
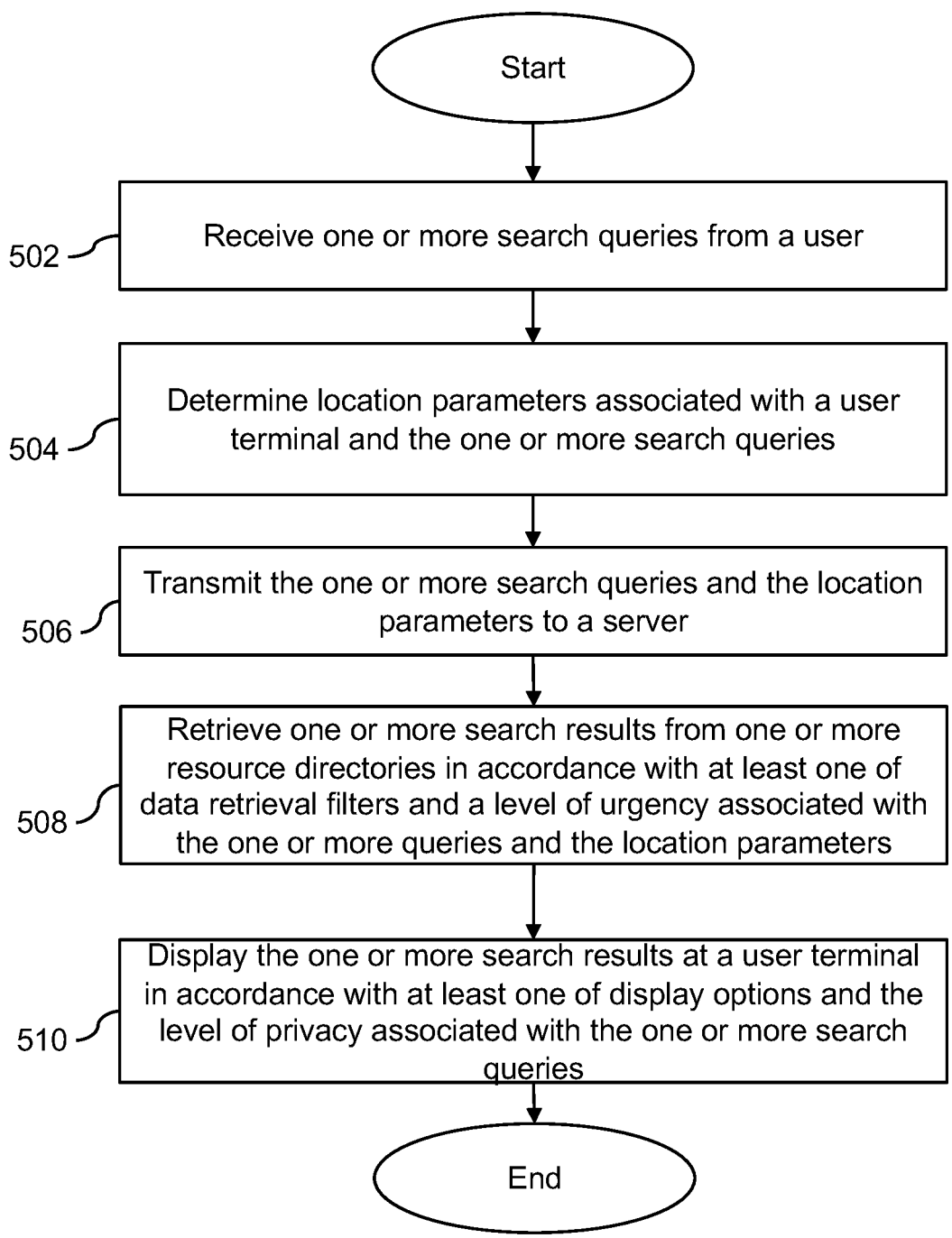
FIG. 5 is a flowchart of an exemplary method to provide assistance to a user during a crisis, in accordance with another embodiment of present invention.

FIG. 5 is a flowchart of an exemplary process 500 to display one or more search results based on a query, in accordance with an embodiment of present invention.

At step 502, the user terminal 102 (shown in FIG. 1) receives one or more search queries from a user. In an exemplary embodiment of the present invention, the user terminal 102 receives the one or more search queries through the user interface 302 (shown in FIG. 3A). The one or more search queries includes at least one of data retrieval filters, display options, a level of urgency and a level of privacy. In other embodiments of the present invention, the data retrieval filters are directed to information such as, but not limited to, type of resource needed and/or description of a crisis. The display options include information relating to presentation of the search results at the user terminal 102. The level of urgency may relate to necessity of required information. The level of privacy may be direct to security to be attributed to the search results.

At step 504, the user terminal 102 determines location parameters associated with the user terminal 102. The location parameters may include latitude and longitude coordinates of the user terminal 102. The location parameters may define a geographical region of the user terminal 102. The user terminal 102 may determine the location parameters using one or more location sensors and/or the one or more search queries.

At step 506, the user terminal 102 transmits the one or more search queries and the location parameters to the assistance platform 112 via the network 106. In an exemplary embodiment of the present invention, the user terminal 102 transmits the one or more search queries and the location parameters to the server 104 via the network 106. In other embodiments of the present invention, the server 104 parses the one or more query to determine the data retrieval filters, the display options, the level of urgency and the level of privacy associated with the one or more search queries. The server 104 may parse the one or more query to determine the data retrieval filters, the display options, the level of urgency and the level of privacy associated with the one or more search queries.

At step 508, the server 104 retrieves one or more search results from one or more resource directories 108 in accordance with at least one of the data retrieval filters and the level of urgency associated with the one or more search queries and the location parameters of the user terminal 102.

At step 510, the server 104 provides the one or more search results to the user terminal 102 to display the one or more results in accordance with at least one of display options and the level of privacy associated with the one or more search queries. The server 104 may categorize the one or more search results before transmitting to the user terminal 102 wherein the search results are directed to public information and social services of a geographically defined region.

Figure 6:
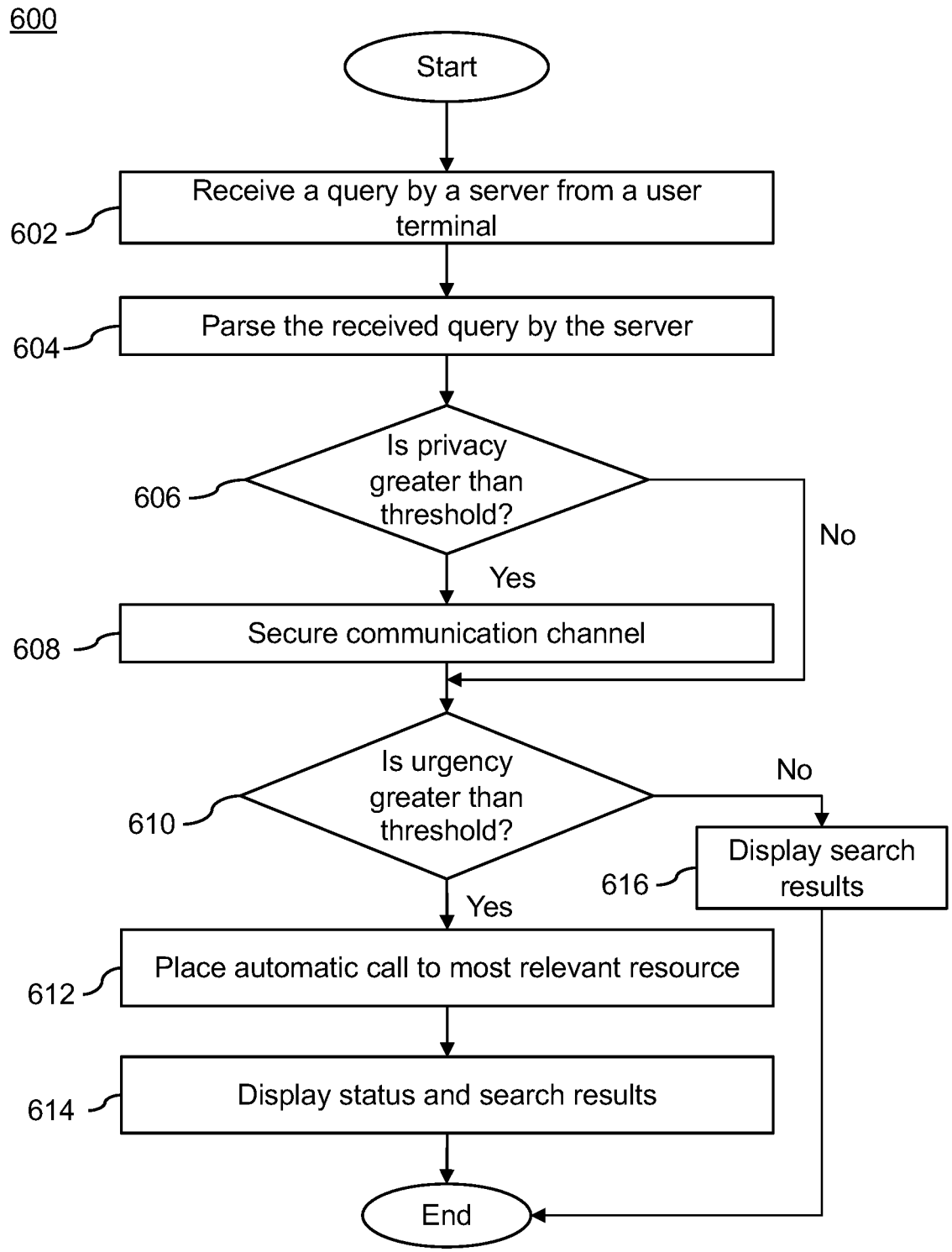
FIG. 6 is a process flow diagram of an exemplary method, in accordance with an embodiment of present invention.

FIG. 6 is a process flow diagram of an exemplary process 600, in accordance with an embodiment of present invention.

At step 602, a natural language query is received by the server 104 from the user terminal 102. The natural language query and location parameters of the user terminal 102 are transmitted to the server 104 through the network 106. In an embodiment of the present invention, the server 104 may retrieve the location parameters from location sensors present on the user terminal 102 or through a network provider used by the user terminal 102.

At step 604, the server 104 may parse the natural language query to identify data retrieval filters, display options, a level of urgency required in providing resources and a level of privacy to be attributed to the search results. The parsed query further includes information or data directed to location of the user, parameters directed to the type of resource needed and/or description of a crisis.

At step 606, the server 104 may determine the level of privacy in relation with a threshold. For example, levels of privacy may be designated as low, medium and high. In case, the level of privacy is determined to be greater than the threshold, then the process 600 proceeds towards step 608. Otherwise, the process 600 proceeds towards step 610.

At step 608, the communication channel between the user terminal 102 and the server 104 is made secure, if the privacy level is determined to be above the threshold. Consequently, none of the interactions following the search query are publicly accessible. Only a subscriber utilizing the user terminal 102 and a relevant registered professional are privy to any interaction.

At step 610, the server 104 determines the level of urgency in relation with a threshold. For example, levels of urgency may be designated as low, medium and high. In case the level of urgency is determined to be greater than a threshold, then the process 600 proceeds towards step 612. Otherwise, the process 600 proceeds towards step 616.

At step 612, upon determination of a level of urgency being greater than the threshold, the server 104 places an automatic call to the most relevant resource retrieved from the resource directory 108.

At step 614, the status of the call and related information are displayed on the graphical user interface 302 of the user terminal 102. Further, other search results corresponding to the natural language query are also displayed on the graphic user interface 302. Alternatively, at step 616, search results corresponding to the natural language query are displayed on the graphical user interface 302.

Embodiments of the present invention are directed to provision of a platform for professionals to showcase their services as a part of results displayed by the resource directory 108 in response to a query from the user terminal 102. For example, librarians may be registers with the system 100, to enable services for navigation of resources so that a subscriber of the search engine obtains the information required. The resource directory 108 may provide links to contact information of vetted librarians or information researchers for such services.

In other embodiments of the present invention, the assistance platform 112 provided by the system 100 may also provide a graphical interface that is directed to a social platform. The social platform may be a public forum, for example, but not limited to, reference, education material, advocacy efforts and project creation. A subscriber provides a query on the graphical interface and is directed to active participants currently online that may aid the subscriber with the query. For example, information pertaining to families, educators, professionals with experience in mental health may be provided to the user terminal 102 when a query on mental health is transmitted to the server 104. In other examples, information relating to addiction counselors providing local treatment services may be provided in response to a corresponding query. Based on identifiers in the query, any social interaction conducted through the system 100 may be designated with a corresponding level of privacy. For example, in response to a query pertaining to a crisis situation of domestic violence, corresponding interactions on the system 100 may be tagged automatically with a high level of privacy.

In other examples, based on the query received, the assistance platform 112 may contact and connect the subscriber to the required professional by an audio or a video call. In yet other embodiments of the present invention, the assistance platform 112 may determine the level of urgency based on the query received. In certain circumstances, the assistance platform 112 may place a call to emergency services and provide the location details of the user terminal 102 to a professional, directing the professional to travel to the location in order to aid the subscriber.

Further, the assistance platform 112 provided by the system 100 may be implemented on other web pages, as a portlet or integrated application programming interface. For example, a field for a query to the search engine may be integrated to a government web page.

Figure 7:
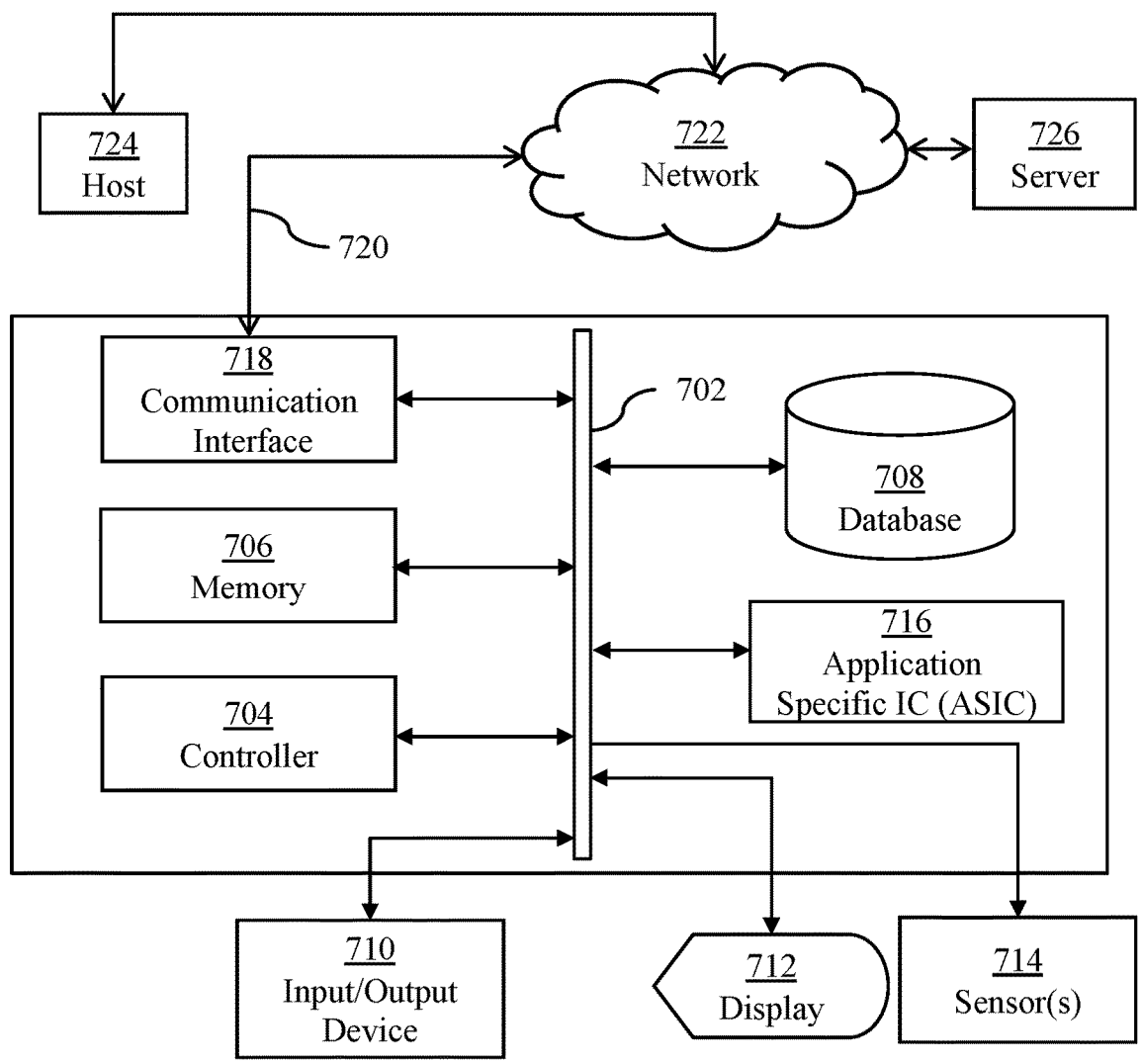
FIG. 7 is a computer system that can be used to implement various exemplary embodiments of the present invention and disclosed subject matter.

FIG. 7 illustrates a computer system 700 upon which the operation of the user terminal 102, the resource directory 108, the server 104, the assistance platform 112 and the data source 110 may be implemented. Although, the computer system 700 is depicted with respect to a particular device or equipment, it is contemplated that other devices or equipment (e.g., network elements, servers, etc.) within FIG. 7 can deploy the illustrated hardware and components of system. The computer system 700 is programmed (e.g., via computer program code or instructions) to retrieve data from the data source 110 described herein and includes a communication mechanism such as a bus 702 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The computer system 700, or a portion thereof, constitutes a means for performing one or more steps retrieving data from the data source 110.

A bus 702 includes one or more parallel conductors of information so that information is transferred quickly among devices coupled to the bus 702. A processor 704 for processing information are coupled with the bus 702. The terms processor and controller can be used interchangeably.

The processor 704 performs a set of operations on information as specified by an end-user. The computer program code is a set of instructions or statements providing instructions for the operation of the processor 704 and/or the computer system 700 to perform specified functions. The code, for example, may be written in a computer programming language that is compiled into a native instruction set of the processor 704. The code may also be written directly using the native instruction set (e.g., machine language). The set of operations include bringing information in from the bus 702 and placing information on the bus 702. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 704, such as a sequence of operation codes, constitute processor instructions, also called computer system instructions or, simply, computer instructions. The processor 704 may be implemented as mechanical, electrical, magnetic, optical, chemical, or quantum components, among others, alone or in combination.

The computer system 700 also includes a memory 706 coupled to the bus 702. The memory 706, such as a Random Access Memory (RAM) or any other dynamic storage device, stores information including processor instructions for storing information and instructions to be executed by the processor 704. The dynamic memory 706 allows information stored therein to be changed by the computer system 700. RAM allows a unit of information stored at a location called a memory address to be stored and retrieved independently of information at neighboring addresses. The memory 706 is also used by the processor 704 to store temporary values during execution of processor instructions. The computer system 700 also includes a Read Only Memory (ROM) or any other static storage device coupled to the bus 702 for storing static information, including instructions, that is not changed by the computer system 700. Some memory is composed of volatile storage that loses the information stored thereon when power is lost. Also coupled to the bus 702 is a non-volatile (persistent) storage device 708, such as a magnetic disk, a solid state disk, optical disk or flash card, for storing information, including instructions, that persists even when the computer system 700 is turned off or otherwise loses power.

Information, including instructions for inspecting the user queries from the user terminal 102 to the server 104, is provided to the bus 702 for use by the processor 704 from an external input device 710, such as a keyboard containing alphanumeric keys operated by a human user, a microphone, an Infrared (IR) remote control, a joystick, a game pad, a stylus pen, a touch screen, or a sensor. The sensor detects conditions in its vicinity and transforms those detections into physical expression compatible with the measurable phenomenon used to represent information in the computer system 700. Other external devices coupled to the bus 702, used primarily for interacting with humans, include a display 712, such as a Cathode Ray Tube (CRT), a Liquid Crystal Display (LCD), a Light Emitting Diode (LED) display, an organic LED (OLED) display, active matrix display, Electrophoretic Display (EPD), a plasma screen, or a printer for presenting text or images, and a pointing device, such as a mouse, a trackball, cursor direction keys, or a motion sensor, for controlling a position of a small cursor image presented on the display 712 and issuing commands associated with graphical elements presented on the display 712, and one or more camera sensors 714 for capturing, recording and causing to store one or more still and/or moving images (e.g., videos, movies, etc.) which also may comprise audio recordings. Further, the display 712 may be a touch enabled display such as capacitive or resistive screen. In some embodiments of the present invention, wherein the computer system 700 performs all functions automatically without human input, one or more of the external input device 710, and display 712 may be omitted.

In the illustrated embodiment of the present invention, special purpose hardware, such as an ASIC 716, is coupled to the bus 702. The special purpose hardware is configured to perform operations not performed by the processor 704 quickly enough for special purposes. Examples of ASICs include graphics accelerator cards for generating images for the display 712, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 700 also includes one or more instances of a communication interface 718 coupled to the bus 702. The communication interface 718 provides a one-way or two-way communication coupling to a variety of external devices that operate with their own processors, such as printers, scanners and external disks. In general, the coupling is with a network link 720 that is connected to a local network 722 to which a variety of external devices with their own processors are connected. For example, the communication interface 718 may be a parallel port or a serial port or a Universal Serial Bus (USB) port on a personal computer. In some embodiments of the present invention, the communication interface 718 is an Integrated Services Digital Network (ISDN) card, a Digital Subscriber Line (DSL) card, or a telephone modem that provides an information communication connection to a corresponding type of a telephone line. In other embodiments of the present invention, the communication interface 718 is a cable modem that converts signals on the bus 702 into signals for a communication connection over a coaxial cable or into optical signals for a communication connection over a fiber optic cable. As another example, the communication interface 718 may be a Local Area Network (LAN) card to provide a data communication connection to a compatible LAN, such as Ethernet™ or an Asynchronous Transfer Mode (ATM) network. In one embodiment of the present invention, wireless links may also be implemented. For wireless links, the communication interface 718 sends or receives or both sends and receives electrical, acoustic or electromagnetic signals, including infrared and optical signals that carry information streams, such as digital data. For example, in wireless handheld devices, such as mobile telephones like cell phones, the communication interface 718 includes a radio band electromagnetic transmitter and receiver called a radio transceiver. In certain embodiments of the present invention, the communication interface 718 enables connection to the network 106 for inspecting the user queries. Further, the communication interface 718 can include peripheral interface devices, such as a thunderbolt interface, a Personal Computer Memory Card International Association (PCMCIA) interface, etc. Although a single communication interface 718 is depicted, multiple communication interfaces can also be employed.

The term "computer-readable medium" as used herein refers to any medium that participates in providing information to the processor 704, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 708. Volatile media include, for example, the dynamic memory 706. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 716.

The network link 720 typically provides information communication using transmission media through one or more networks to other devices that use or process the information. For example, the network link 720 may provide a connection through the local network 722 to a host computer 724 or to ISP equipment operated by an Internet Service Provider (ISP).

A server 726, connected to the Internet, hosts a process that provides a service in response to information received over the Internet. For example, the server 726 hosts a process that provides information representing video data for presentation at the display 712. It is contemplated that the components of the computer system 700 can be deployed in various configurations within other computer systems, e.g., the host 724 and the server 726.

At least some embodiments of the present invention are related to the use of the computer system 700 for implementing some or all of the techniques described herein. According to one embodiment of the present invention, those techniques are performed by the computer system 700 in response to the processor 704 executing one or more sequences of one or more processor instructions contained in the memory 706. Such instructions, also called computer instructions, software and program code, may be read into the memory 706 from another computer-readable medium such as the storage device 708 or the network link 720. Execution of the sequences of instructions contained in the memory 706 causes the processor 704 to perform one or more of the method steps described herein. In alternative embodiments of the present invention, hardware, such as the ASIC 716, may be used in place of or in combination with software to implement the invention. Thus, embodiments of the present invention are not limited to any specific combination of hardware and software, unless otherwise explicitly stated herein.

Various forms of computer readable media may be involved in carrying one or more sequence of instructions or data or both to the processor 704 for execution. For example, instructions and data may initially be carried on a magnetic disk of a remote computer such as the host 724. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 720. An infrared detector serving as the communication interface 718 receives the instructions and data carried in the infrared signal and places information representing the instructions and data onto the bus 702. The bus 702 carries the information to the memory 706 from which the processor 704 retrieves and executes the instructions using some of the data sent with the instructions. The instructions and data received in the memory 706 may optionally be stored on the storage device 708, either before or after execution by the processor 704.

The article presented as part of the invention is not exclusive to the description above. Other related embodiments may be derived in accordance with the principles of the invention described above. Changes within the scope of current invention may be implemented by people skilled in the art.

The exemplary embodiments of this present invention have been described in relation to a system and method to provide social services. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present invention. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect.

Moreover, though the description of the present invention has included the description of one or more embodiments, configurations, or aspects and certain variations and modifications, other variations, combinations, and modifications are within the scope of the present invention, e.g., as may be within the skill and knowledge of those in the art, after understanding the present invention. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
   receiving, at a user terminal, a search query from a user, wherein the search query comprises a data retrieval filter, a display option, a level of urgency, and a level of privacy;
   parsing, by the server, the search query to determine the data retrieval filter, the display option, the level of urgency and the level of privacy;
   determining location parameters associated with the user terminal and the search query;
   transmitting, by the user terminal, the search query and the location parameters to a server;
   retrieving, by the server, a search result from one or more resource directories in accordance with the search query and the location parameters; and
   displaying, by the server, the search result at the user terminal.

2. The method of claim 1, further comprising:
   transforming, by the server, the search result in a predefined format.

3. The method of claim 1, further comprising categorizing the search result.

4. The method of claim 1, wherein the search result is related to public information and social services of a geographical region defined by the location parameters of the user terminal.

5. The method of claim 1, further comprising updating the resource directory at predefined intervals.

6. A method comprising:
   receiving, at a user terminal, a search query from a user, wherein the search query comprises a data retrieval filter, a display option, a level of urgency and a level of privacy;
   parsing, by the server, the search query to determine a data retrieval filter, the display option, the level of urgency and the level of privacy;
   determining location parameters associated with the user terminal and the search query;
   transmitting, by the user terminal, the search query and the location parameters to a server;
   retrieving, by the server, a search result from one or more resource directories in accordance with the data retrieval filter and the level of urgency associated with the search query and the location parameters; and displaying, by the server, the search result at the user terminal in accordance with the display option and the level of privacy associated with the search query.

7. The method of claim 6, further comprising updating the resource directory at predefined intervals.

8. The method of claim 6, further comprising categorizing the search result.

9. The method of claim 6, further comprising:
transforming, by the server, the search result in a predefined format.

10. The method of claim 6, wherein the search result is related to public information and social services of a geographical region defined by the location parameters of the user terminal.

11. A system comprising:
a user terminal configured to receive a search query from a user, wherein the search query comprises a data retrieval filter, a display option, a level of urgency and a level of privacy; and
a server, communicably coupled to the user terminal, wherein the server is configured to:
receive the search query and location parameters associated with the user terminal;
parse the search query to identify the data retrieval filter, the display options, the level of urgency and the level of privacy;
retrieve a search result from a resource directory in accordance with the data retrieval filter and the level of urgency associated with the search query and the location parameters; and
display the search result at the user terminal in accordance with the display option and the level of privacy associated with the search query.

12. The system of claim 11, wherein the server is further configured to update the resource directory at predefined intervals.

13. The system of claim 11, wherein the server is further configured to transform the search result in accordance with a predefined format.

14. The system of claim 11, wherein the user terminal is further configured to determine the location parameters using a location sensor.

15. The system of claim 11, wherein the server is further configured to categorize the search result.

16. The system of claim 11, wherein the search result is related to public information and social services of a geographical region defined by the location parameters of the user terminal.

* * * * *